F. G. Johnson,
Chuck for Drilling Machine,
Nº 56,059.          Patented July. 3, 1866.
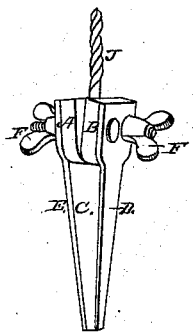
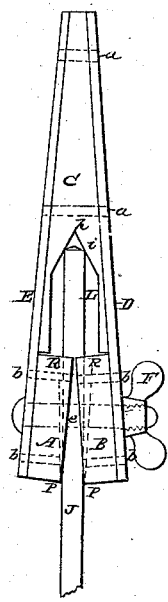
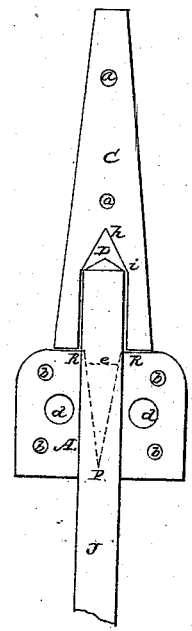
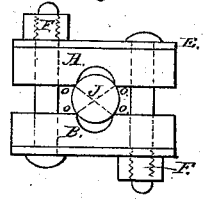
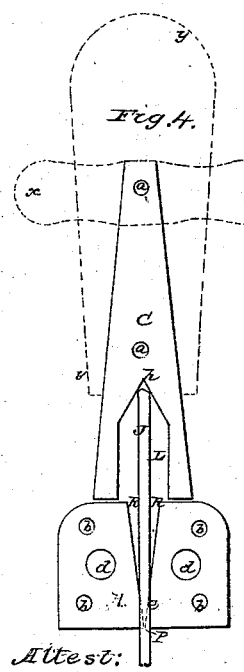
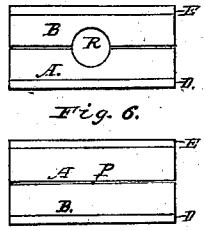
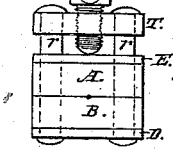
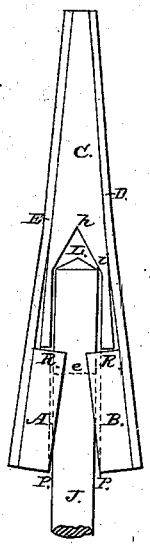
Attest:
Horace May.
A. M. Mills.
Inventor:
Frank G. Johnson.

UNITED STATES PATENT OFFICE.

FRANK G. JOHNSON, OF BROOKLYN, NEW YORK.

IMPROVEMENT IN DRILL-CHUCKS.

Specification forming part of Letters Patent No. 56,059, dated July 3, 1866.

*To all whom it may concern:*

Be it known that I, FRANK G. JOHNSON, of Brooklyn, in the county of Kings and State of New York, have invented a new and Improved Method of Constructing Universal Drill-Chucks; and I do hereby declare that the following is a full and exact description thereof, reference being had to the accompanying drawings, and to the letters of reference marked thereon, in which—

Figure 1 is a perspective view; Figs. 2, 3, 4, and 5, longitudinal sections, (Figs. 2 and 5 being cut at right angles to Figs. 3 and 4;) Figs. 6, 7, and 8, transverse sections.

Like letters refer to like parts.

The object of my invention is to furnish a cheap chuck for holding different-sized drills, gimlets, wire, &c., to be used especially in hand-braces, but which may be used as well in a lathe or brad-awl handle or a gimlet-handle, (by giving a proper shape to or providing for the shank C a suitable handle.)

A and B are hardened steel jaws riveted to steel spring-plates E and D, the rivets being shown by dotted lines $b\, b\, b\, b$ in Fig. 2 and by the holes $b\, b\, b\, b$ in Figs. 3 and 4. C is a steel shank, to which the spring-plates E and D are riveted, the rivets being shown by the dotted lines $a\, a$ in Fig. 2 and by the holes $a\, a$ in Figs. 3 and 4. F is a bolt and nut for bringing and holding the jaws A and B together.

In the shank C is a circular socket, L, with straight parallel sides, (as large in diameter as is the largest drill which is to be held by the chuck,) and the upper end or bottom of which is made with a long true taper and brought to a point at $h$ in Figs. 2, 3, 4, and 5.

The steel spring-jaws A and B are made with all the opposite sides parallel to each other and all the faces perfectly plain except the two inner faces, in each of which is a vertical tapering semi-jaw-hole. This tapering hole is made and described thus: The two jaws A and B are held together and a tapering hole drilled and reamed out between them, so that the center of the tapering hole is between the two jaws, the hole itself being about two-thirds as large at the end next to the shank C as the largest drill to be carried, and coming (with a true taper) to a mere point at the opposite side or edge of the jaws, as shown in Fig. 6, where R represents the large and P the small end of the tapering jaw-hole, and the taper of which is shown by the dotted lines R P and R P, Figs. 3 and 4.

The operation of the chuck is thus described: The object of the socket L and its tapering bottom is to guide the back end of the drill to the center of the chuck and to firmly hold it there from moving in any lateral direction, which it accomplishes with any drill, from the size of the finest wire to the full size of the socket L itself. This socket also prevents the drill from being pushed back when in use, and the harder it is crowded the firmer it is held. The object of the spring-jaws A B, taken in connection with the tapering hole through them, is to produce such a peculiar combination of shape and motion as will render the chuck capable of grasping and clamping within the edges (lines R P and R P) of its jaws any drill, from the size of the finest wire to the full diameter of the socket L in the shank C—that, too, with the least possible motion of the jaw-springs E and D, so that the said springs may be made thick, short, and strong.

The manner in which these spring-jaws receive and hold drills of so great difference in diameter is shown by Figs. 3 and 4. In Fig. 4 a small drill, J, is held at about the point $e$, where the tapering hole R P is of suitable size to grasp it on the edges or lines R P and R P, while in Fig. 3 the points of contact between the drill and the lines R P and R P is at or near the locality of $e$ in this figure. The largest drill (to be used in one of these chucks of a given size) will be clamped at the upper end of the tapering hole, at R, and the smallest drill at the lower end of the tapering hole, at the point P, and intermediate-sized drills will be held at intermediate points of the tapering hole, between the points R and P. As in Fig. 5, the largest drill J does not come in contact with the jaws A B at all at the point P, while the small drill J, Fig. 4, does not come at all in contact with the jaws A and B at the point R.

Though the drill be of considerable size, the jaws have but a slight motion to take it in, as the drill is principally received into the tapering hole R P.

Fig. 7 shows how the edges of the tapering hole R P grasp the drill J at four points, $o\ o\ o\ o$, (or with four jaws,) though there are but two jaws, A and B, to the chuck. These four points are about equidistant from each other, and the diameter of the tapering hole being always less than that of the drill at the point of contact with itself enables the jaws to take a very biting or firm hold of the drill, to resist the torsion strain, as shown by the sharp corners $o\ o\ o\ o$, Fig. 7. The combined action of the shank C and jaws A and B holds the drill at the back end and near the middle, which firmly secures it against the lateral strain.

The springs E and D being exactly alike in strength and action, the jaws A and B center the lower or front end of the drill and bring it into the proper line of motion.

By means of the two bolts and thumb-nuts F F a gripe sufficiently powerful for all practical purposes is obtained. However, I do not confine myself to the use of thumb-nuts, as wrench-nuts can be used, as in Fig. 7; neither do I confine myself to nuts and bolts, as rivets $r\ r$ and a set-screw, S, can be employed, as in Fig. 8, or any other suitable device may be used for the purpose; but by making the shank C round it can be used in a lathe; or by a handle (shown by the dotted lines in Fig. 4—dotted lines $y\ y$) it can be used for reaming and countersinking, and for brad-awls and a variety of small tools, without either lathe or brace; or by means of a T-handle (shown by the dotted lines $x\ x$, Fig. 4) it can be employed for carrying gimlets and bits of different sizes.

What I claim as my invention, and desire to secure by Letters Patent, is—

1. The double spring-jaws A B, made with the tapering hole R P between them, in the manner and for the purposes substantially as described.

2. The combination of the said jaws, as described, with the shank C and its tapering-bottomed socket L, by means of which different-sized drills are at once both centered and held at the back end and about midway of their length by simply screwing up the nuts F F, essentially in the manner and for the purposes set forth.

FRANK G. JOHNSON.

Witnesses:
  HORACE MAY,
  A. M. MILLS.